United States Patent [19]

Nonaka

[11] Patent Number: 5,355,451
[45] Date of Patent: Oct. 11, 1994

[54] GRAPHIC PROCESSING UNIT

[75] Inventor: Katsumi Nonaka, Atsugi, Japan

[73] Assignee: Fuji Xerox Co., Ltd., Tokyo, Japan

[21] Appl. No.: 849,580

[22] Filed: Mar. 11, 1992

[30] Foreign Application Priority Data

Mar. 12, 1991 [JP] Japan ............................ 3-046813

[51] Int. Cl.⁵ .............................................. G06F 15/62
[52] U.S. Cl. ....................... 395/166; 395/164; 395/165; 345/190
[58] Field of Search ............... 340/747; 395/129–131, 395/140–143, 164–166; 345/98, 100, 133, 189, 190

[56] References Cited

U.S. PATENT DOCUMENTS 4,974,172  11/1990  Nakai ............................. 395/143
5,016,001   5/1991  Minagawa et al. ............... 340/747

*Primary Examiner*—Heather R. Herndon
*Assistant Examiner*—Almis Jankus

*Attorney, Agent, or Firm*—Finnegan, Henderson, Farabow, Garrett & Dunner

[57] ABSTRACT

A painting processing unit obtains minimum and maximum values of data of a graphic in the Y direction, and effective scan lines are initialized. Then, it obtains coordinates of intersection points of the graphic contour and the scan lines, and X coordinates are sequentially registered in an edge list. A judgment is made as to whether the edge list has overflowed. If it has not overflowed, the edge list is rearranged after registering X coordinates of all intersection points, and painting is performed. If it has overflowed, the graphic is divided in two, and the effective scan lines are reset within a range of one-half of the initialized range. Then, all intersection points of contour and scan lines are obtained again, and only the X coordinates of intersection points within the reset effective scan lines are registered in the edge list. If there is no overflow, the divided graphic only within the range of the reset effective scan lines is painted. By the above processes, graphic painting according to an ordered edge list algorithm can be performed with lower memory capacity.

3 Claims, 9 Drawing Sheets

PRIOR ART

FIG. 11

GRAPHIC PROCESSING UNIT

BACKGROUND OF THE INVENTION

The present invention relates to a graphic painting method for painting or filling a graphic by restoring contour of a graphic from bending points of said graphic.

The processing for painting a graphic is a very important technique in computer graphics, and it is indispensable for the case where code information is developed in raster image. In particular, it is used in recent years for painting characters in case outline font is used. Various methods have been proposed for painting graphic. An ordered edge list algorithm is known as a painting method with side applications. A brief description of this method is given below. In the present specification, the term "graphic" also includes characters, symbols, etc.

FIG. 8 is a flow chart of painting processes according to the ordered edge list algorithm. It is supposed that a list of coordinate data of 7 vertexes shown by (1)–(7) is given in FIG. 9. All of the vertexes are connected sequentially to form contour points. For the intersection points of these contour points with straight lines where Y coordinates in memory is N (N is an integer of 0 or more.), X coordinates are obtained. (Hereinafter these straight lines are referred as "effective scan lines".) These X coordinates are matched with Y coordinates and are registered on an ordered edge list (hereinafter referred as "edge list") (Step S20). In this case, the intersection points such as (1), (3) or (4), which are maximal or minimal points in Y direction, are counted as two points. The intersection points such as (2) or (7), which are neither a maximal point nor a minimal point, are counted as one point without duplication. The intersection points such as (5) or (6), which are maximal point or minimal point in X direction, are counted as one point.

In the above procedure, for sequentially tracing countour points of the graphic from coordinate data of the given vertexes, Bresenham's linear interpolation can be used, for example. It is needless to say that any other method can be used if contour points of the graphic can be obtained. In FIG. 9, the X direction represents a main scanning direction in a display unit, page printer, etc., and the Y direction represents an auxiliary scanning direction. The same applies hereinafter.

By performing Step S20 between all of the vertexes, X coordinates of all intersection points of graphic contour with effective scan lines as shown by circles in FIG. 10 are obtained (Step S21). By the above procedure, X coordinates of all intersection points matching with Y coordinates are registered in an edge list as shown in FIG. 11A.

Next, as shown in FIG. 11B, X coordinates registered in the edge list are rearranged in the ascending order of Y coordinates. Further, as shown in FIG. 11C, X coordinates are rearranged with respect to each Y coordinate, and a coordinate list of intersection points is prepared as shown in FIG. 11D (Step S22). Then, looking at the edge list thus rearranged from the top, pairs of X coordinates including adjacent odd and even numbers are selected, such as 1st and 2nd, or 3rd and 4th, with respect to each Y coordinate. By setting a predetermined pixel pattern between these pairs of X coordinates, painting or filling of the graphic is performed (Step S23). For example, in FIG. 11D, X coordinates from 3 to 6 are painted at the position Y=2. At the position Y=4, X coordinates from 3 to 6 and from 8 to 10 are painted. In this way, the graphic is painted as shown in FIG. 12.

However, in the graphic painting by conventional ordered edge list algorithm, painting cannot be achieved in case the data of X coordinates for the intersection points of the contour with the effective scan lines exceed memory capacity to store the edge list.

For example, in case outline font is developed in a bit map, a memory to store the edge list is usually designed in such capacity that a complicated Chinese character having the highest number of intersections of contour with the effective scan lines can be developed in bit map data. If more complicated characters, symbols, or graphics are to be prepared, it is no longer possible to develop in bit map data. Of course, such a problem can be avoided by using a memory having very large capacity, but this leads to very expensive cost. In case of small-scale graphic processing units such as word processors or personal computers, it is impossible or impractical to maintain memory area abundant enough to store such an edge list.

SUMMARY OF THE INVENTION

It is an object of the present invention to provide a method for painting or filling a graphic, by which it is possible to paint the graphic by an ordered edge list algorithm with lower memory capacity.

To attain the above object, the graphic painting method according to the present invention comprises memory means for storing coordinate data of contour points of a graphic, judging means for judging whether said memory means has overflowed, and dividing means for dividing and for painting the graphic in case it is judged by said judging means that said memory means has overflowed.

For painting the graphic, (X, Y) coordinates of contour points are obtained from (X, Y) coordinates of bending points. The X coordinates of the contour points are rearranged with respect to Y coordinates in the ascending order. Further, X coordinates are rearranged with respect to each Y coordinate. Pairs of X coordinates are prepared including adjacent odd numbers and even numbers from the X coordinates thus rearranged, and a predetermined pixel pattern is set between these pairs of X coordinates.

The above division of graphic is also performed in the direction of Y coordinates.

Further, said memory means comprises 2-dimensional memory, in which the numbers of lines and rows are variable. The number of lines is determined at first according to the maximal Y coordinates and the minimal Y coordinates of said graphic. In case the memory means has overflowed, it is determined according to the maximal Y coordinates and the minimal Y coordinates of the divided graphic.

In addition, the first row of each line of said memory means is assigned to an index area and the other rows are assigned to coordinate storage area. In the coordinate storage area of each line, X coordinates matching with Y coordinates corresponding to said line are stored. In said index area, the number of X coordinates written in the coordinate storage area following said index area is written.

BRIEF DESCRIPTION OF THE DRAWINGS

Figure 11:
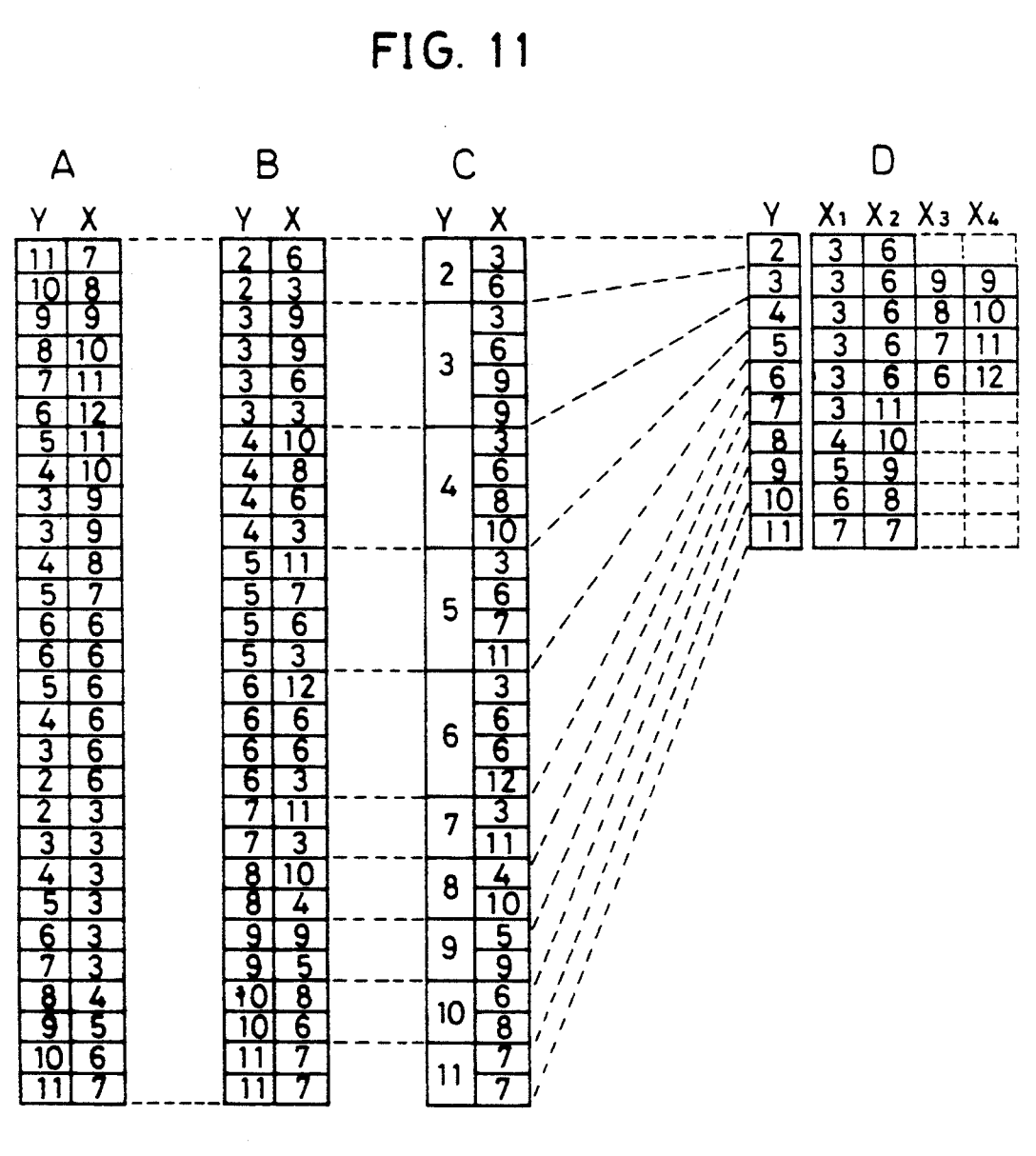

FIG. 11 is to explain re-arrangement of an edge list; and

DESCRIPTION OF THE PREFERRED EMBODIMENT

Figure 1:
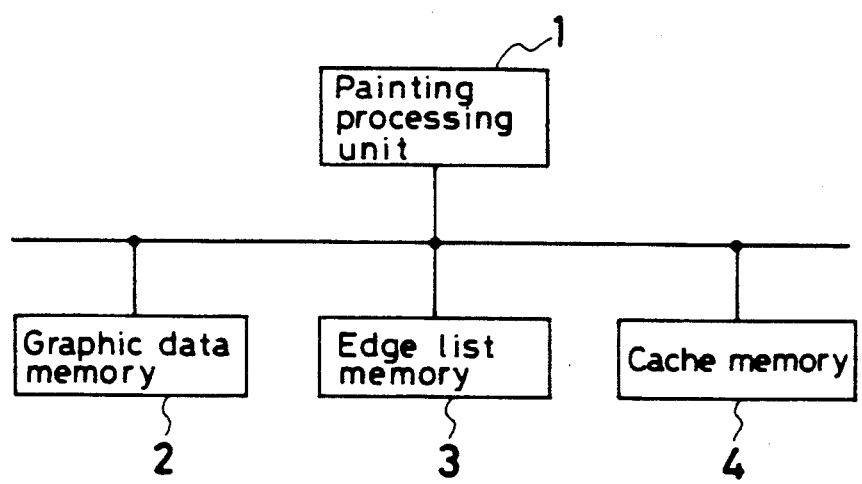
FIG. 1 shows the arrangement of an embodiment of a graphic painting method according to the present invention.

In the following, a description will be given of an embodiment of the present invention in connection with the drawings. FIG. 1 is a diagram showing the arrangement of an embodiment of the graphic painting method according to the present invention, and FIG. 2 represents a flow chart showing processes in the graphic painting method of this invention.

Figure 2:
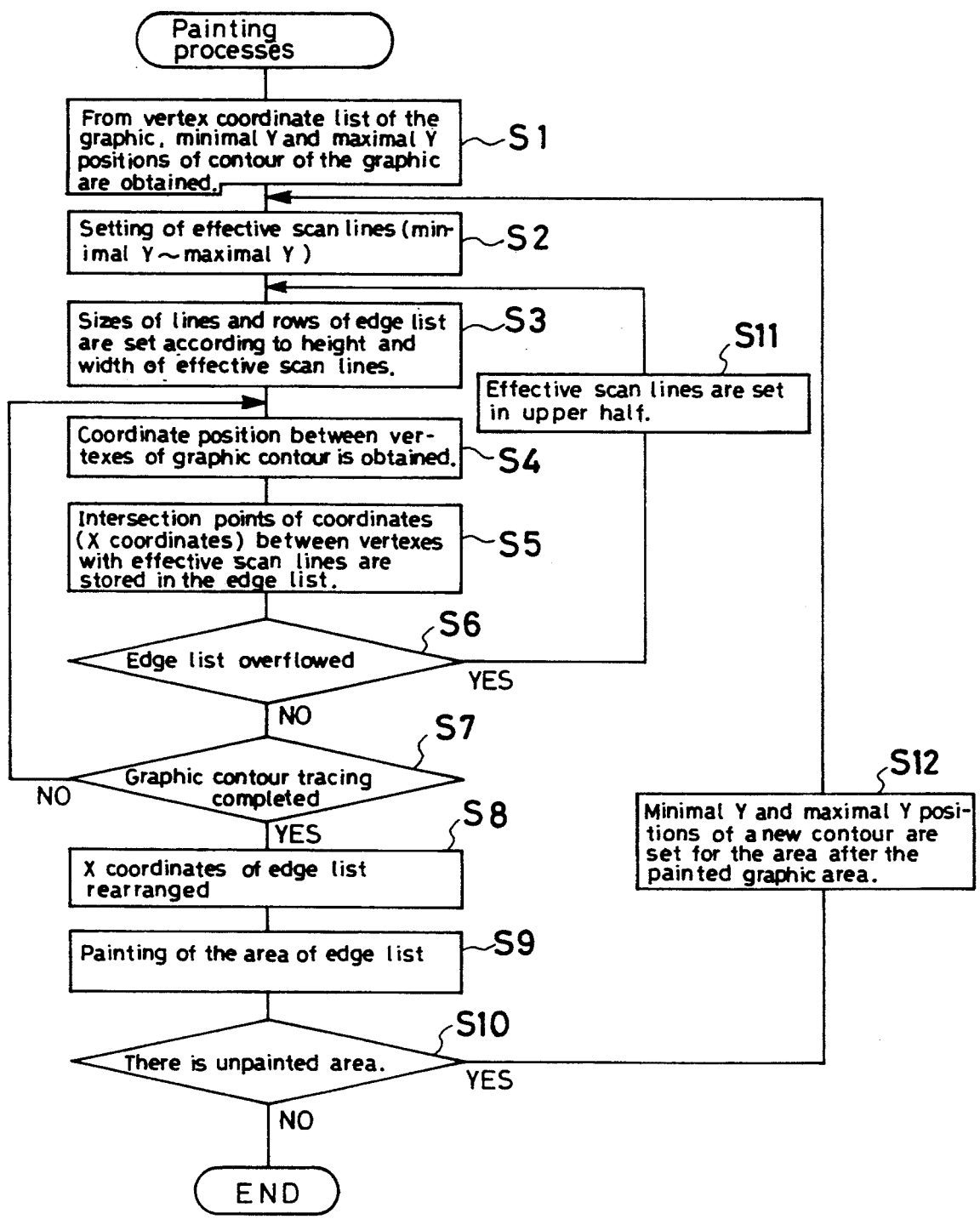
FIG. 2 is a flow chart showing a flow of processings of the graphic painting method of the present invention.

In FIG. 1, a painting processing unit 1 comprises a CPU and its peripheral circuits and executes the processings as given in FIG. 2.

Figure 9:
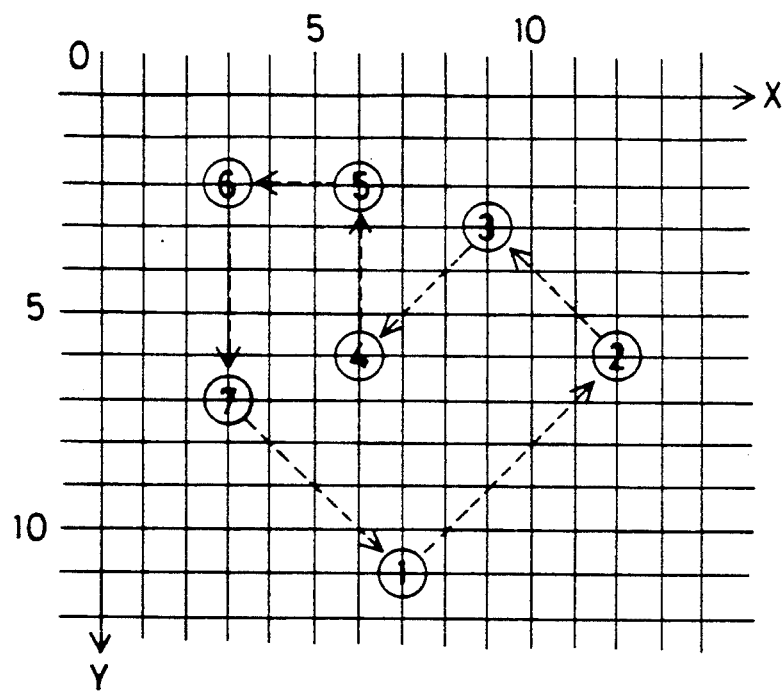
FIG. 9 shows an example of inputted graphic data.
Figure 10:
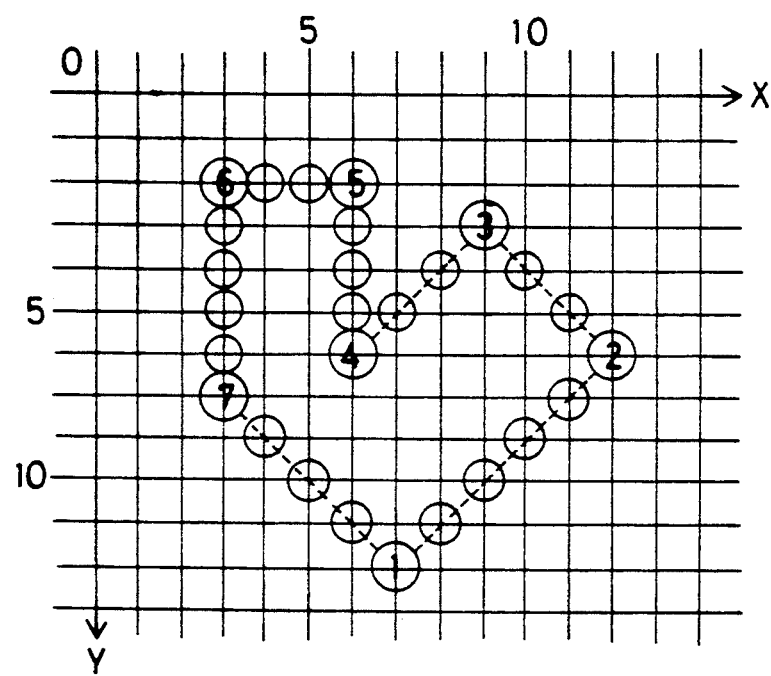
FIG. 10 represents intersection points of contour of the graphic obtained by linear interpolation with scan lines.
Figure 12:
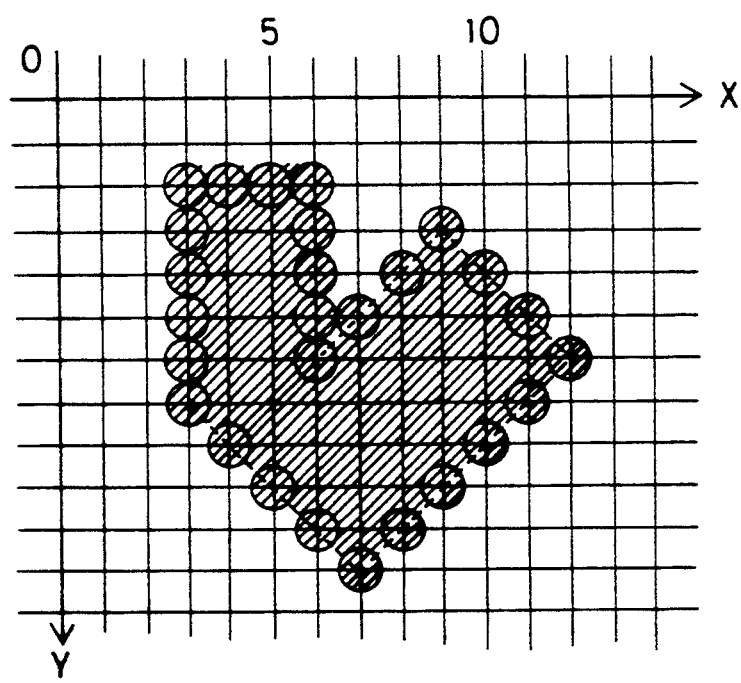
FIG. 12 shows a painted graphic.

The data of a graphic to be painted or filled is written in a graphic data memory 2 from a graphic processing unit (not shown). For example, as shown in FIG. 9, the data may be coordinate data of vertexes of said graphic or may be an aggregation of starting points and end points of vectors showing contour of the graphic. Here, it is supposed that a list of coordinates of vertexes of the graphic is given.

Next, the operation of the painting processing unit 1 will be described.

Figure 4:
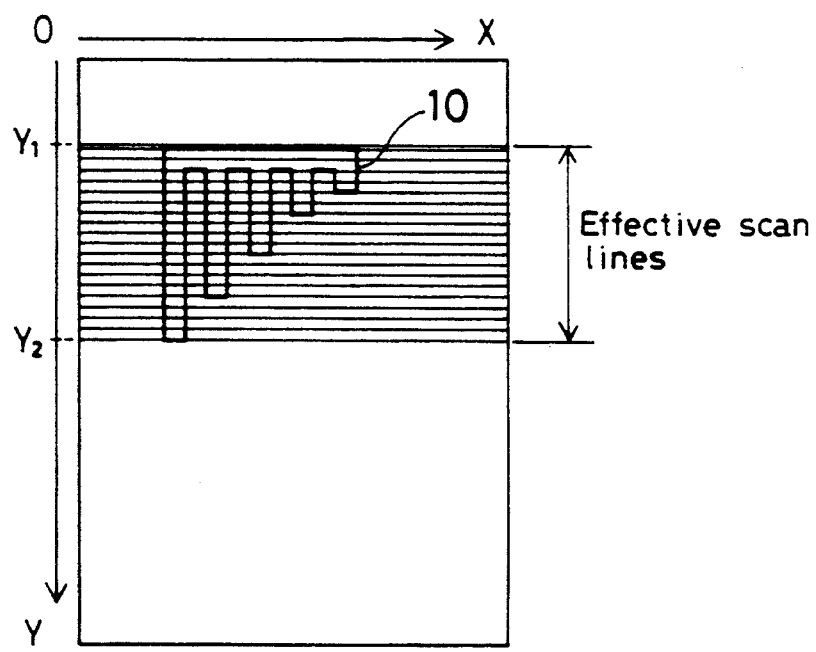
FIG. 4 is to explain initial setting of effective scan lines.

When a coordinate list of the vertexes is written in the graphic data memory 2, the painting processing unit 1 obtains minimum value and maximum value of Y coordinates of the contour of the graphic, referring a vertex coordinate list (Step S1) and sets the range of the minimum and the maximum values as effective scan lines (Step 2). For example, if the vertex coordinate list of a graphic shown by 10 in FIG. 4 is written in the graphic data memory 2, minimum value $Y_1$ and maximum value $Y_2$ of Y coordinates are obtained from the vertex coordinate list, and effective scan lines are set between $Y_1$ and $Y_2$.

When the effective scan lines are set, the painting processing unit 1 sets sizes of lines and rows of an edge list to be formed on an edge list memory 3 depending upon height and width of the effective scan lines thus set (Step S3).

Figure 3:
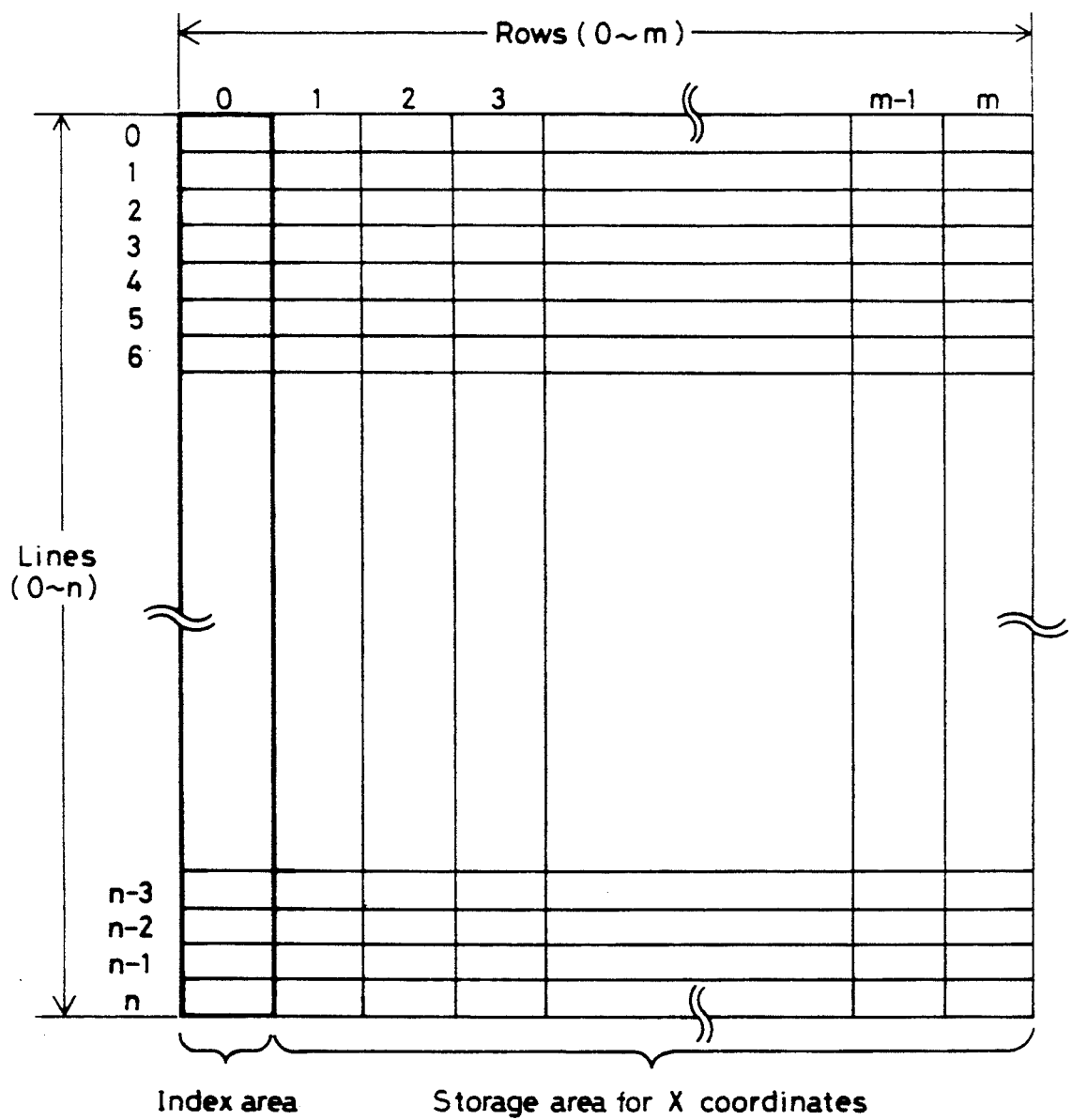
FIG. 3 shows a structure of an edge list memory.

As shown in FIG. 3, the edge list memory 3 comprises a 2-dimensional buffer memory, which has fixed total capacity but can change the numbers of lines and rows. Therefore, the number of lines is in inverse proportion to the number of rows. The number of lines is determined by the number of the effective scan lines set in the Step S2, and this determines in turn the number of rows, i.e. the maximum number of X coordinates, which can be registered as intersection points of contour of the graphic with the effective scan lines. For example, if the number of effective scan lines of a graphic is 50, the number of lines of the edge list memory 3 is 50. If the number of rows of the edge list memory 3 is 20, the number of the edge list memory 3 is 40 and the number of rows is 25 in case of a graphic where the number of the effective scan lines is 40.

The top of each line of the edge list memory 3, i.e. 0-th row, is an index area where the number of X coordinates registered in the line is written. For example, if the intersection points of contour of the graphic with an effective scan line are 3, "3" is written in the index area of a line, which corresponds to said effective scan line, and X coordinates of the intersection points are written in the subsequent 1st–3rd rows. In the process of contour tracing, the painting processing unit 1 writes X coordinates of intersection points to a corresponding line of the edge list each time the intersection point of contour and the effective scan line is obtained. The value of the index area is also updated. In this case, if the painting processing unit 1 judges that the value in the updated index area exceeds the number of the rows set in the Step S3, it is judged that the edge list memory 3 has overflowed. In case all contents written in the edge list memory 3 are made invalid, the painting processing unit 1 writes "0" in the index area.

When the processing of Step S3 is completed, the painting processing unit 1 obtains the next contour point between vertexes of the graphic from a given vertex coordinate list (Step S4) and writes X coordinates of intersection point of the contour point thus obtained and the effective scan line to a corresponding line of the edge list memory 3 and updates the value of the index area of said line (Step S5). Further, it is judged whether the edge list memory 3 has overflowed or not from the value of the updated index area (Step S6).

If it is judged that the edge list memory 3 has not overflowed, the painting processing unit 1 judges whether the tracing of all contours of the graphic has been completed or not (Step S7). If completed, the processing of Step S8 is performed. If not, the processes of Step S4 and after are repeated. That is, the processes of the Steps S4–S7 are performed each time a contour point is obtained in the contour tracing process.

Figure 5:
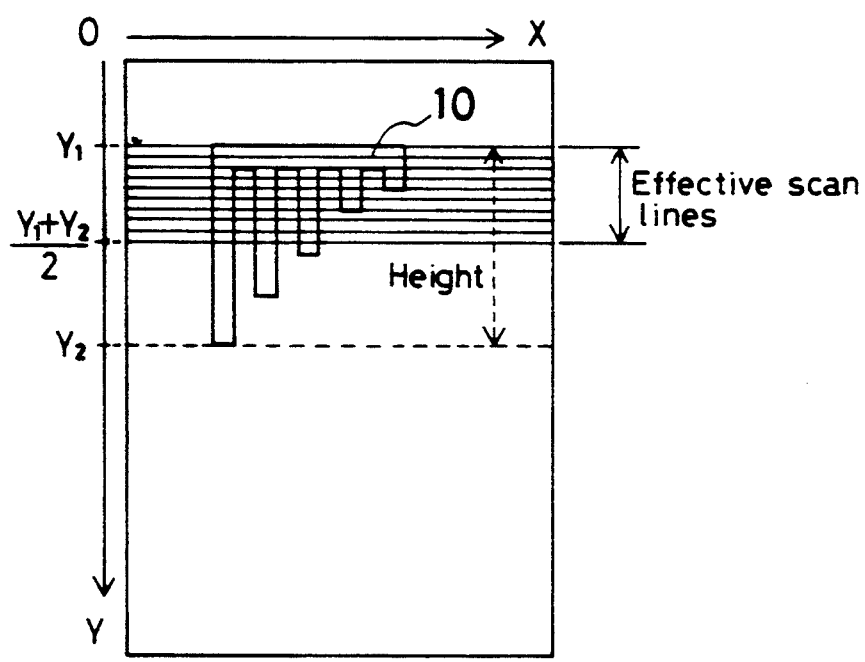
FIG. 5 is to explain re-initialization of the effective scan lines.

However, if it is judged that the edge list memory 3 has overflowed in Step S6, the painting processing unit 1 writes "0" in the index areas of all lines of the edge list memory 3 and invalidates the contents already written. Branching off from Step S6 to Step S11, effective scan lines are set again within the range of upper half of the effective scan lines as set in Step S2. For example, in case the edge list memory 3 has overflowed while the above processings are performed for the graphic 10 in FIG. 4, the effective scan lines to be reset in Step S11 are within the range from $Y_1$ to $(Y_1+Y_2)/2$ as shown in FIG. 5. Namely, the graphic 10 is divided into two.

When the effective scan lines are reset, the painting processing unit 1 returns to Step S3 and sets sizes of lines and rows of an edge list to be formed in the edge list memory 3 depending upon height and width of the effective scan lines reset in Step S11. For example, if there are 50 lines×20 rows by the initial setting in the processing of Step S3, the size of the edge list to be set after returning to Step S3 from Step S11 is: 25 lines × 40 rows. Thus, X coordinates for more intersection points can be written in each line.

Figure 7:
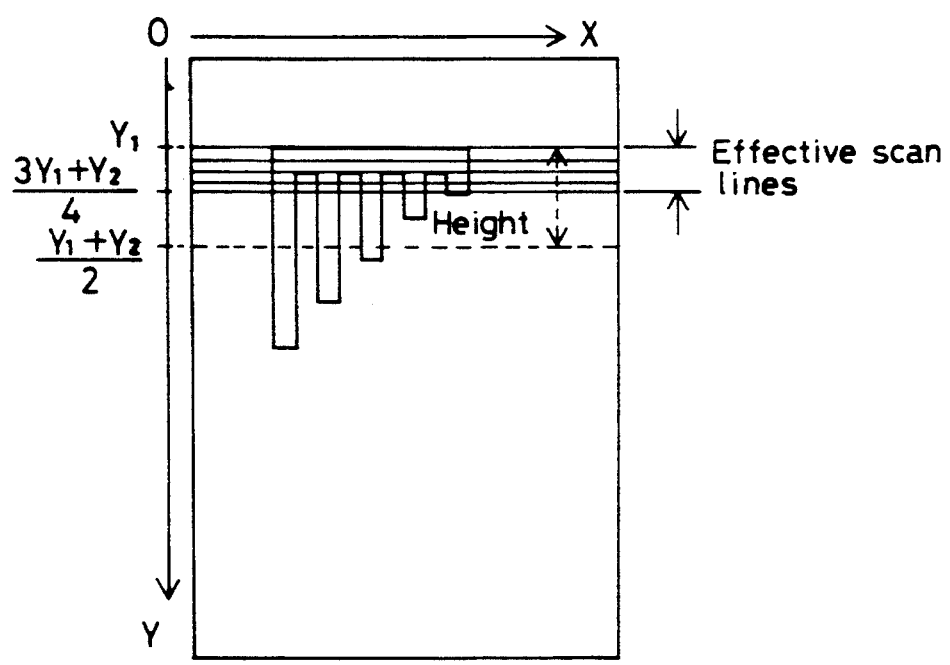
FIG. 7 shows the effective scan lines reinitialized from the state of FIG. 5.

Then, the painting processing unit 1 obtains again the next contour point between vertexes of the graphic from the given vertex coordinate list (Step S4) and writes only the X coordinates of intersection points of the obtained contour point with an effective scan line within the range of the effective scan lines as set in Step S11 to a corresponding line of the edge list memory 3. Further, the value of the index area of said line is updated (Step S5), and it is judged whether the edge list memory 3 has overflowed from the value of the updated index area or not (Step S6). If it is judged that the edge list memory 3 has overflowed in Step S6, effective scan lines are set in upper half of the effective scan lines previously set in Step S11. For example, if the edge list memory 3 has overflowed twice, the width of the effective scan lines is reduced to one-half in Step S11. In the case of FIG. 5, the effective scan lines are set again to the range from $Y_1$ to $(3Y_1+Y_2)/4$ as shown in FIG. 7, and the above processes are repeated. Specifically, the effective scan lines set in Step S11 are located in the upper ¼ of the height of the graphic.

Figure 8:
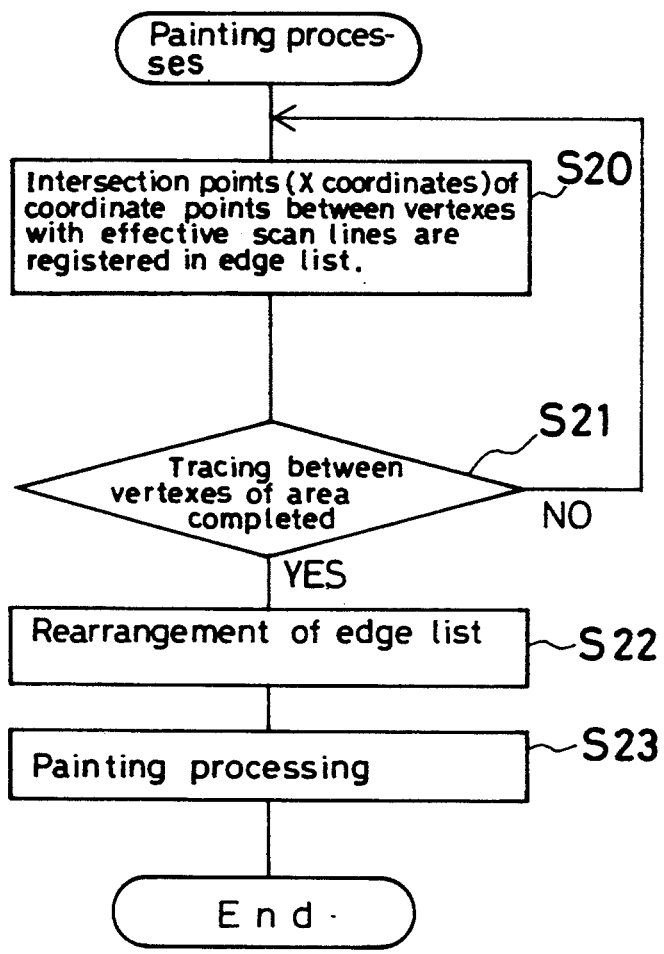
FIG. 8 is a flow chart showing painting processings by the ordered edge list algorithm.

The painting processing unit 1 repeatedly executes the above processes. If it is judged that tracing of all contours of the graphic has been completed in Step S7, the edge list is rearranged similarly to the Steps S22 and S23 of the conventional painting processing as shown in FIG. 8 (Step S8). Through painting processing (Step S9), it is judged whether there is any unpainted area (Step S10). If it is judged in Step S10 that overflow of the edge list memory 3 is not detected, the total area of the graphic will be painted in Step S9. If it is judged that there is no unpainted area in Step S10, the painting processing unit 1 finishes the painting. If there remains any unpainted area, the painting processing unit 1 considers lower portion of the painted area as a new graphic contour. Thus, minimum and maximum values of Y coordinates of contour of the graphic are seeked (Step S12). New effective scan lines are set within the range of the minimum and maximum values (Step S2), and the above processes are repeated.

Figure 6:
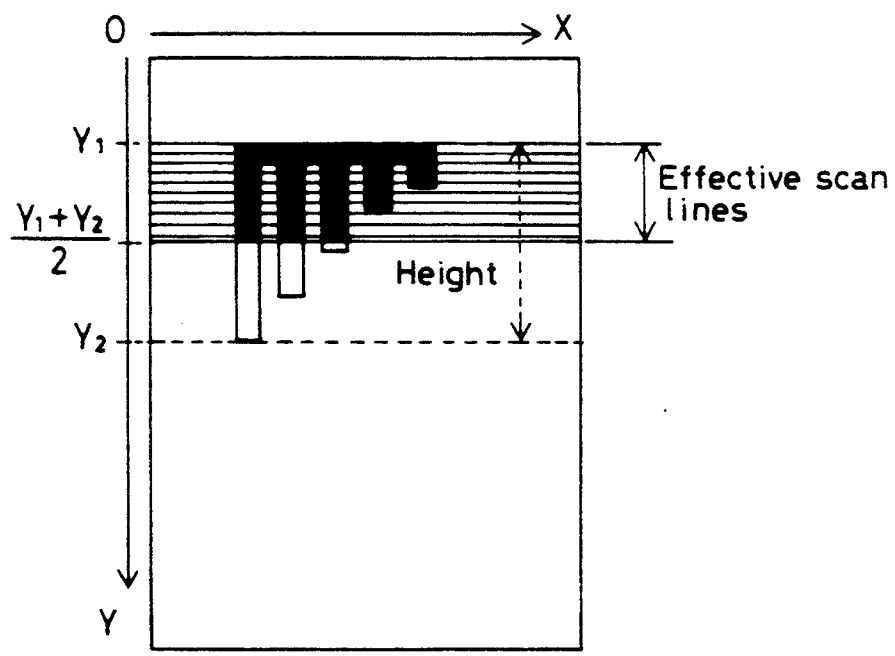
FIG. 6 is a drawing for explaining division painting.

For example, in case the registration of X coordinates for intersection points of contour with effective scan lines is completed without overflow of the edge list memory 3 by the effective scan lines as reset in Step S11, only the range of the reset effective scan lines is painted in Steps S8 and S9 as shown in FIG. 6. Branching off from Step S10 to Step S12, new effective scan lines are set in the remaining half, i.e. within the range of from $(Y_1+Y_2)/2$ to $Y_2$, and the above processes are repeated.

The graphic where the above processes for painting have been performed is developed in a cache memory 4 and is further written in a page memory (not shown) and is used for display in display unit or for hard copy of a page printer.

Having now fully described the invention in connection with a preferred embodiment, the present invention is not limited to the embodiment described, and it will be apparent to those skilled in the art that many changes and modifications can be made without departing from the spirit or scope of the invention as set forth herein. For example, effective scan lines are reset in one-half of the range of the previous setting in the above embodiment, whereas it may be desirable only to reduce the number of divisions as low as possible, and the setting can be made, for example, to ⅓ or ¼ of the range.

In case the edge list memory overflows and effective scan lines are reset, there may be provided means for judging whether a line connecting vertexes of the graphic is included in the effective scan lines. If it is not included, the computation to obtain contour points of Step S4 may be omitted, and the processing time may be shortened by processing the line connecting the vertexes of the next graphic.

Further, in case the edge list memory overflows and effective scan lines are reset, the edge list developed in the edge list memory up to the moment may be primarily saved to the other memory means, and only the edge list corresponding to the reset effective scan lines may be stored from the saved edge list. Then, the contour points connecting the vertexes of the graphic obtained so far can be utilized, and the process can be performed continuously. If the edge list developed so far in the edge list memory is taken up or given away according to the reset effective scan lines and is re-assigned only within the edge list memory, the other memory means as described above is not required.

If the edge list is sequentially stored in the edge list memory and the edge list corresponding to each scan line is sequentially selected, useless area actually not used in the edge list memory can be reduced, and the edge list memory can be more efficiently utilized. In this case, if the edge list memory overflows, continuous processing can be performed if the edge list is taken up or given away according to the effective scan lines after resetting and is re-assigned.

It will be apparent to those skilled in the art that the above and other obvious modifications can be made as needed.

What we claim is:

1. A graphic painting apparatus, comprising:
   edge list memory means for storing coordinate data of contour points of a graphic;
   judging means for judging whether storage of the coordinate data causes said memory means to overflow;
   division processing means for dividing the coordinate data into data portions successively stored in said memory means and painting the graphic by painting the successively stored data portions in case it is judged by said judging means that said memory means has overflowed; and
   wherein (X, Y) coordinates of contour points are obtained from (X, Y) coordinate data of bending points, X coordinates of the contour points are rearranged with respect to Y coordinates in ascending order, further X coordinates are rearranged with respect to each Y coordinate, a pair of X coordinates is made up with X coordinates of odd number and those of even number, and the graphic is painted by setting a predetermined pixel pattern between said pair of X coordinates.

2. A graphic painting apparatus, comprising:
   edge list memory means for storing coordinate data of contour points of a graphic;
   judging means for judging whether storage of the coordinate data causes said memory means to overflow;
   division processing means for dividing the coordinate data into data portions successively stored in said memory means and painting the graphic by painting the successively stored data portions in case it is judged by said judging means that said memory means has overflowed; and said memory means comprising a 2-dimensional memory, which can change the numbers of lines and rows, the number of lines being determined at first according to maximal Y coordinates and minimal Y coordinates of said graphic and, in case the memory means has overflowed, being determined according to maximal Y coordinates and minimal Y coordinates of a divided graphic.

3. A graphic painting apparatus, comprising:

edge list memory means for storing coordinate data of contour points of a graphic;

judging means for judging whether storage of the coordinate data causes said memory means to overflow;

division processing means for dividing the coordinate data into data portions successively stored in said memory means and painting the graphic by painting the successively stored data portions in case it is judged by said judging means that said memory means has overflowed;

said memory means comprising a 2-dimensional memory, which can change the numbers of lines and rows, the number of lines being determined at first according to maximal Y coordinates and minimal Y coordinates of said graphic and, in case the memory means has overflowed, being determined according to maximal Y coordinates and minimal Y coordinates of a divided graphic; and wherein the first row of each line of said edge list memory means is assigned to an index area, and the other rows are assigned to coordinate storage areas respectively, X coordinates matching with Y coordinates corresponding to each line are stored in a coordinate storage area of each line, and the number of X coordinates written the coordinate storage area following said index area is written in said index area.

* * * * *

UNITED STATES PATENT AND TRADEMARK OFFICE
CERTIFICATE OF CORRECTION

PATENT NO. : 5,355,451
DATED : October 11, 1994
INVENTOR(S) : Katsumi NONAKA

It is certified that error appears in the above-indentified patent and that said Letters Patent is hereby corrected as shown below:

Claim 3, column 8, line 17 after "written" insert

--in--.

Signed and Sealed this

Thirtieth Day of May, 1995

Attest:

BRUCE LEHMAN

Attesting Officer          Commissioner of Patents and Trademarks